2,894,977
PROCESS OF PREPARING PHENOXYCINNAMIC ACID DERIVATIVES

Walter Siedel, Bad Soden (Taunus), and Helmut Nahm and Henning Pini, Frankfurt am Main, Germany, assignors to Farbwerke Hoechst Aktiengesellschaft vormals Meister Lucius & Brüning, Frankfurt am Main, Germany, a corporation of Germany No Drawing. Application December 18, 1956
Serial No. 628,982
Claims priority, application Germany December 24, 1955
13 Claims. (Cl. 260—471)

In J. Chem. Soc. 1949, Suppl. Issue I, page 190 et seq., a synthesis of thyroxine, which, starting from the preparation of 3,5-dinitro-4-(4'-methoxy-phenoxy)-benzaldehyde continues by condensation of 4-hydroxy-3,5-dinitrobenzaldehyde with 4-methoxyphenol (cp. German Patent No. 891,261) according to the process relating to the corresponding benzylidene-oxazolone and described in Biochem. J., 21 (1927), page 169 et seq.

Now we have found a continuous process facilitating the preparation of valuable therapeutics prepared from the diphenyl ether series by treating 3-iodo-5-nitro-4-hydroxy-benzaldehyde in the presence of tertiary organic bases with aliphatic or aromatic sulfonic acid halides and by adding simultaneously, without isolating the ammonium compounds formed, phenols of the general formula

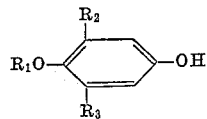

wherein $R_1$ represents hydrogen, alkyl-, aralkyl- and acyl-radicals and $R_2$ and $R_3$ represent hydrogen, halogen, the amino- or the nitro group and wherein $R_1$ can be linked in a ring-system with $R_2$ or $R_3$. The compounds obtained and corresponding to the general formula

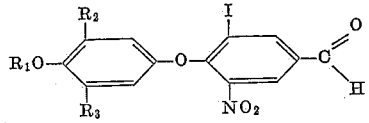

wherein $R_1$, $R_2$ and $R_3$ have the meanings already mentioned, are condensed with acylamino acetic acids; the oxazolone ring system formed is hydrolyzed with the aid of alkali alcoholates or aqueous alkalis to form the corresponding alpha-acylamino-cinnamic acids or the esters thereof. The nitro groups present are reduced in the usual manner to amino groups which are exchanged over the diazonium compounds for iodine. If desired, the double bond can be hydrogenated in the 3,5-di-iodo-4-phenoxy-acylamino-cinnamic acid derivates with the aid of hydriodic acid in the presence of red phosphorus, and a further iodine atom may be introduced in 3'-position by treatment with p-toluene sulfonic acid potassium iodamide in an alkaline medium.

It has been surprising that even the 3-iodo-5-nitro-4-hydroxy-benzaldehyde containing adjacent to the hydroxyl group one nitro group enters the condensation with substituted phenols; this facilitates the preparation of the phenoxy-benzaldehydes occurring as intermediates, which fact is the more surprising as a summarizing report on the experiments as to the thyroxine-synthesis in Chem. and Ind., 1950, page 663 et seq., expressly emphasizes that, in order to succeed in the condensation of a 4-hydroxy-benzaldehyde with 4-methoxyphenol as described in J. Chem. Soc., pages 190 et seq. (1949), Suppl. Issue, the hydroxy group in 4-position of the benzaldehyde has to be activated by two vicinal nitro groups. Moreover, those skilled in the art had to consider that during the reduction of the nitro group(s), especially the catalytical hydrogenation of the acylaminocinnamic acids on their esters containing this (these) group(s) an iodine atom in the 3-position would be replaced by hydrogen.

The method of this invention can take place according to the following scheme if, for example, 3-iodo-5-nitro-4-hydroxybenzaldehyde and 4-benzoyloxy-phenol are used as starting materials:

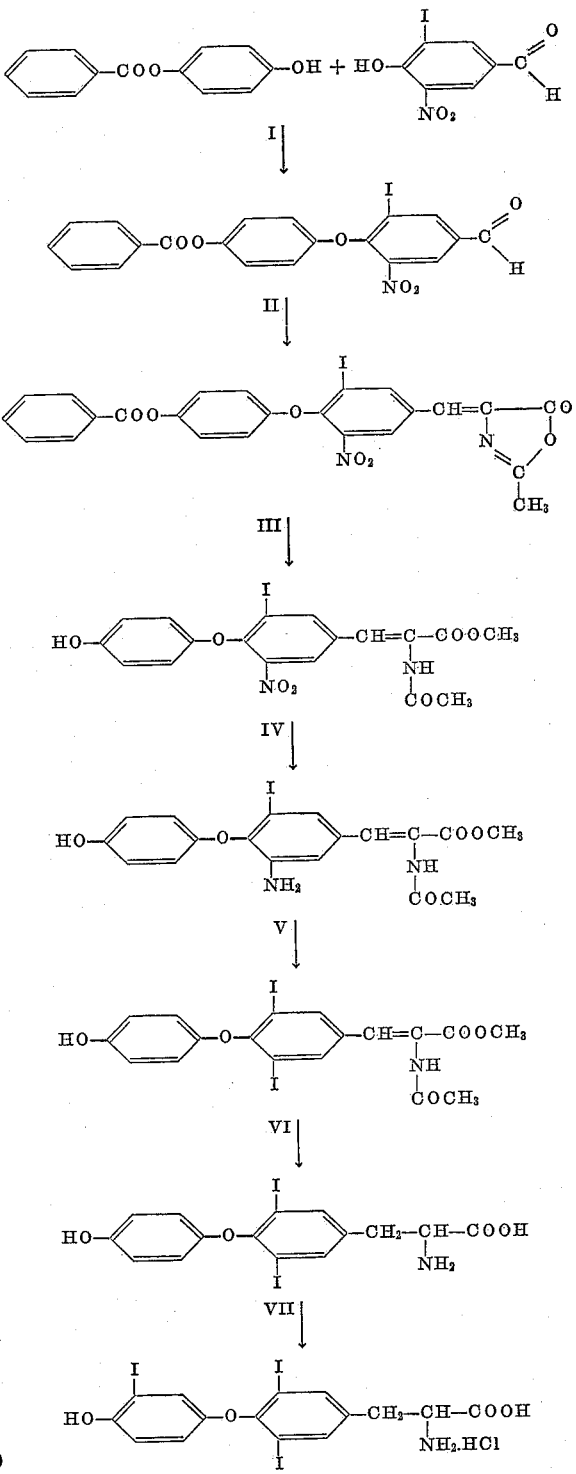

As substituted phenols which may be used for the reaction with 3-iodo-5-nitro-4-hydroxy-benzaldehyde according to the process of the present invention there may be mentioned for instance: hydroquinone, nitrohydroquinone, 4-alkoxy-phenols, such as 4-methoxy-phenol, 4-ethoxy-phenol, 4-propoxy-phenol, 4-butoxy-phenol, furthermore such phenols as are substituted in 4-position by higher alkoxy groups with up to 20 carbon atoms; such as 4-acyloxyphenols wherein acyl means fatty acid radicals containing at most 20 carbon atoms, benzoic acid radicals which may be substituted, and hydroxy- or keto fatty acid groups. The phenyl nucleus can, of course, also contain further substituents, such as halogen atoms or nitro- or amino groups, for instance 4-methoxy-3-iodo-phenol or 4-methoxy-3-nitro-phenol or 4-methoxy-3-acylamino-phenol, respectively. In the same way compounds, as for instance 5-hydroxy-2-phenyl-benzoxazol are suitable.

As sulfonic acid halides there may be used those having an aliphatic or aromatic character. There may be mentioned for instance: methane sulfonic acid chloride, benzene-sulfonic acid chloride, or toluenesulfonic acid chloride.

As tertiary organic bases there come into consideration trialkyl amines as well as corresponding heterocycles with tertiary nitrogen, preferably pyridine. Additionally there may be mentioned for instance trimethylamine, triethylamine, tributylamine, dimethylaniline, diethylaniline, the picolines, dimethylpyridines, trimethylpyridines and quinolines.

The reaction in the first reaction stage is suitably carried through in such a way that a suspension of the 3-iodo-5-nitro-4-hydroxybenzaldehyde in dry tertiary bases is reacted, while stirring, with the sulfonic acid halide; it may be worked at room temperature or even at moderately elevated temperature. After the reaction has been finished the substituted phenol is added to the reaction mixture without isolating the ammonium compound formed. The mixture obtained is heated for some time to boiling.

It is possible either to work in the presence or in the absence of solvents. For instance aromatic hydrocarbons, such as benzene, toluene and xylene, preferably, however, an excess of the tertiary aromatic base used, serve as solvents.

The benzylidene-oxazolones obtained in the second reaction stage are prepared by reacting 4-phenoxy-benzaldehyde obtained in the first reaction stage with acylaminoacetic acids, with acetylamino acetic acid (aceturic acid), propionyl aminoacetic acid (N-propionyl glycine), stearoyl aminoacetic acid (N-stearoyl glycine), beta-phenyl propionyl aminoacetic acid (N-(beta-phenyl propionyl)glycine), or benzoyl amino acetic acid (hippuric acid). This condensation is performed in the presence of anhydrides of lower aliphatic fatty acids, preferably acetic anhydride, and of alkali metal salts of corresponding fatty acids, such as sodium acetate, and advantageously at an elevated temperature.

In the third reaction stage the hydrolysis of the oxazolone ring in the benzylidene-oxazolones to the corresponding acylamino cinnamic acids or the esters thereof is carried out. Preferably alkali alcoholates of low aliphatic alcohols or even aqueous alkalis are used and temperatures ranging between 35° C. and 100° C. are applied for the reaction.

In the fourth reaction stage the nitro group (or groups if the phenol used as initial reactant contained one or more nitro groups) in the acylamino cinnamic acid derivatives is reduced to the amino group. This reaction may be carried through by catalytical hydrogenation, for example in the presence of Raney-nickel or palladium having a small activity as catalysts as well as with the aid of ferrous compounds, preferably with ferrous hydroxide or with alkalidithionites. The reaction advantageously takes place in solvents, for instance, low aliphatic alcohols, preferably methanol.

In the fifth reaction stage the amino group formed by reduction in diazotized and the compounds thus obtained are converted according to the usual method into substituted 3,5-di-iodo-4-phenoxy-acylamino cinnamic acids or the esters thereof. The diazotization suitably takes place in the presence of dimethylformamide and advantageously in a mixture of concentrated sulfuric acid and glacial acetic acid.

The conversion of the diazonium salt into the desired di-iodo derivative is preferably carried through with the aid of a solution of iodine in aqueous potassium iodide. The reaction temperatures range suitably between 20° C. and 50° C.

In case a further reaction of the 3,5-di-iodo-4-phenoxy-acylamino-cinnamic acids obtained is desired in order to obtain the corresponding phenylalanine derivatives, the necessary hydrogenation of the double bond is suitably carried through with hydriodic acid. It is advantageous to add ferrous sulfate and red phosphorus and to maintain the reaction temperature between 20° C. and 40° C. If the reaction takes place in the aforedescribed way, acyl radicals are simultaneously separated at the amino nitrogen atom of the alanine residue and ether is hydrolyzed in 4'-position.

Finally a further iodine atom can be introduced in 3'-position, if desired; suitably elementary iodine in an alkaline medium is allowed to act on the substituted phenoxy-phenylalanine derivatives. It has proven to be especially advantageous if elementary iodine is replaced by p-toluene sulfonic acid potassium iodamide. This reaction results in a good yield of pure iodination products.

The process of the present invention enables the preparation of compounds in good yields. These compounds are on the one hand already known as valuable therapeutics, such as DL-3,3',5-triiodine-thyronine and thyroxine, and on the other hand they are important as intermediates for the preparation of medicaments.

The following examples serve to illustrate the invention but they are not intended to limit it thereto:

EXAMPLE 1

(a) *3-iodo-5-nitro-4(4'-methoxy-phenoxy)-benzaldehyde*

106 grams of 3-iodo-5-nitro-4-hydroxybenzaldehyde are suspended in 370 cc. of dry pyridine and the suspension obtained is reacted at 20° C. while stirring with 70 grams of benzenesulfonic acid chloride. After 2 hours 90 grams of 4-methoxy-phenol are added and the reaction mixture is gently heated to boiling for one hour. The principal amount of the pyridine is then distilled off under reduced pressure and the residue is digested with 2 N hydrochloric acid. After being separated from the hydrochloric acid, the reaction product is extracted three times with dethyl ether and the residue is washed with 2 N sodium hydroxide solution and water. The residue consisting of 3-iodo-5-nitro-4(4'-methoxy-phenoxy)-benzaldehyde is recrystallized from di-n-butyl ether. Yield: 98 grams; melting point 101° C. (corrected).

(b) *2''-phenyl-4''-[3-iodo-5-nitro-4(4'-methoxy-phenoxy)-benzylidene]-oxazolone-(5'')*

Following the procedure of Example 3(b), 2''-phenyl-4''-[3-iodo-5 - nitro - 4(4' - methoxy - phenoxy) - benzylidene]-oxazolone-(5'') is obtained if the aceturic acid used in Example 3 is replaced by 21 grams of hippuric acid. The oxazolone derivative which has separated is filtered with suction and then washed with carbon tetrachloride and water. After the whole has been dried the yield amounts to 40 grams; melting point 214° C. (corrected).

(c) *3-iodo-5-nitro-4(4'-methoxy-phenoxy)-α-benzoyl-amino-cinnamic acid methyl ester*

326 grams of 2''-phenyl-4''[3-iodo-5-nitro-4(4'-methoxy-phenoxy)-benzylidene-oxazolone-(5'') are introduced within a period of ten minutes while stirring into a sodium methylate solution prepared from 2500 cc. of methanol and 36 grams of sodium. A clear orange-red solution is formed. The crystal magma separating after the addition of 160 cc. of acetic acid of 95 percent strength is filtered with suction and then washed with ether. The raw product of the desired 3-iodo-5-nitro-4(4'-methoxy-phenoxy)-alpha-benzoylamino-cinnamic acid methyl ester is then recrystallized from the mixture of 1600 cc. of acetic acid of 95 percent strength and 400 cc. of dimethyl-formamide. Yield: 277 grams; melting point 220° C. (corrected).

(d) *3-iodo-5-amino-4(4'-methoxy-phenoxy)-alpha-benzoylamino-cinnamic acid methyl ester*

200 grams of 3-iodo-5-nitro-4(4'-methoxy-phenoxy)-alpha-benzoylamino-cinnamic acid methyl ester are hydrogenated in a shaking device at room temperature in a mixture of 1000 cc. of tetrahydrofurane and 1000 cc. of methanol, while adding 50 grams of Raney-nickel. In the course of the hydrogenation the substance originally suspended completely dissolves. Within 2 hours 23 litres of hydrogen are taken up. After being separated from the catalyst the light yellow solution is concentrated under reduced pressure until crystallization begins. After having been cooled for a prolonged time, the whole is filtered with suction and washed with ether. Yield: 172 grams of 3-iodo-5-amino-4(4'-methoxy-phenoxy)-alpha-benzolyamino-cinnamic acid methyl ester; melting point 188° C. (corrected).

(e) *3,5-di-iodo-4(4'-methoxy-phenoxy)-alpha-benzoyl-amino-cinnamic acid methyl ester*

10 grams of sodium nitrite are added while stirring and cooling with an ice-sodium chloride mixture to 180 cc. of concentrated sulphuric acid. At a temperature not exceeding 10° C. 300 cc. of acetic acid of 95 percent strength are dropped in. Now a solution of 45 grams of 3-iodo-5-amino - 4(4'-methoxy-phenoxy) - α - benzoyl-amino-cinnamic acid methyl ester in a mixture of 105 cc. of dimethylformamide and 45 cc. of acetic acid of 95 percent strength is added dropwise at a temperature of 0° to +5° C. to this nitrosylsulfuric acid solution. After stirring for half an hour the diazonium salt solution is introduced in thin jets into a strongly stirred mixture of 1200 cc. of water, 450 cc. of chloroform, 28 grams of potassium iodide and 30 grams of urea, a vivid evolution of nitrogen taking place. Part of the di-iodine compound formed separates. After the reduction of excess iodine with concentrated sodium bisulfite solution, the solid substance separated out is filtered off with suction. The chloroform solution is then separated from the aqueous phase, washed with water and evaporated. The remaining substance is united with the main quantity and recrystallized from a mixture of 340 cc. of acetic acid of 95 percent strength and 200 cc. of dimethylformamide. Yield: 43 grams of 3,5-di-iodo-4(4'-methoxy-phenoxy)-α-benzoylamino-cinnamic acid methyl ester in the form of colorless needles; melting point 225–226° C. (corrected).

(f) *DL-3,5-di-iodo-4(4'hydroxy-phenoxy)-phenylalanine (DL-3,5-di-iodo-thyronine)*

While cooling with ice 300 cc. of acetic anhydride are dropwise added to 300 cc. of hydriodic acid of a density of 1.70. After the addition of 0.2 gram of ferrous sulfate and 36 grams of red phosphorus 60 grams of 3,5-di-iodo-4(4' - methoxy-phenoxy)-α-benzoylamino - cinnamic acid methyl ester are introduced into the mixture, in the course of which the forming methyl iodide is continuously distilled off. The reaction is terminated after about 90 minutes. Thereupon the red phosphorus is filtered off with suction and the clear filtrate is evaporated to dryness. By digesting twice with 150 cc. of isopropyl ether each the separated benzoic acid is extracted. Now the residue is introduced into 480 cc. of water and 50 cc. of concentrated hydrochloric acid and the mixture is heated to boiling. From the clear solution thus formed the DL-3,5 di-iodo-thyronine is precipitated with concentrated aqueous ammonia solution. The product is filtered off with suction, washed with water, methanol and acetone and dried. Yield: 44.4 grams of a white powder; melting point of the methyl ester: 178° C.

(g) *DL-3,3',5-tri-iodo-thyronine-hydrochloride*

3 grams of DL-3,5-di-iodo-thyronine are dissolved in dilute sodium hydroxide solution (60 cc. of water and 14 cc. of 1 N sodium hydroxide solution). Within 40 minutes a solution of 1.8 grams of p-toluene sulfonic acid-potassium-iodamide in 30 cc. of water is then dropped in and stirring is continued for further 30 minutes at room temperature. Subsequently the mixture is adjusted to a pH of 6 with acetic acid of 95 percent strength, whereupon the DL-3,3',5-tri-iodo-thyronine precipitates. For cleaning purposes the precipitate is filtered with suction and boiled with 500 cc. of 2 N hydrochloric acid. In the course of the filtration in the heat about 0.15 gram of DL-thyroxine remain; 2.95 grams of DL-3,3',5-tri-iodo-thyronine-hydrochloride crystallize out from the filtrate.

EXAMPLE 2

(a) *3-iodo-5-nitro-4(4'-benzoylhydroxy-phenoxy)-benzaldehyde*

106 grams of 3-iodo-5-nitro-4-hydroxybenzaldehyde are suspended in 340 cc. of dry pyridine and the suspension is reacted with 70 grams of benzene sulphonic acid chloride at a temperature of 20° C., while stirring. The mixture is allowed to stand for 2 hours, 123 grams of 4-benzoylhydroxyphenol are then added and the whole is heated to boiling for 90 minutes. Thereupon most of the pyridine is distilled off under reduced pressure and the residue is digested with 2 N hydrochloric acid. After the hydrochloric acid has been separated the residue is first treated with 800 cc. and subsequently again with 400 cc. of benzene. The benzene solution is shaken thoroughly with 2 N sodium hydroxide solution and then with much water. After having been treated with animal charcoal the benzene solution is concentrated and the resulting 3-iodo-5-nitro-4(4' - benzoylhydroxyphenoxy) benzaldehyde of di-N-butyl-ether is recrystallized. Yield: 133 grams; melting point: 142° C. (corrected).

(b) *2"-methyl-4"-[3-iodo-5-nitro-4(4'-benzoylhydroxy-phenoxy)-benzylidene]-oxazolone-(5")*

19 grams of 3-iodo-5-nitro-4(4'-benzoylhydroxyphen-oxy)-benzaldehyde, 5.0 grams of aceturic acid and 4 grams of anhydrous sodium acetate are heated in 25 cc. of acetic anhydride to 100° for 2½ hours. The 2"-methyl-4"-[3-iodo-5-nitro-4(4'-benzoyl - hydroxy - phen-oxy)-benzylidene]-oxazolone-(5") separated out in the form of crystals is sucked off and washed first with carbon tetrachloride and then with water. Yield: 20.5 grams after recrystallization from glacial acetic acid; melting point: 206° C. (corrected).

(c) *3-iodo-5-nitro-4(4'-hydroxy-phenoxy)-α-acetyl-amino-cinnamic acid methyl ester*

19.5 grams of 2"-methyl-4"-[3-iodo-5-nitro-4(4'-benzoylhydroxy-phenoxy)-benzylidene]-oxazolone - (5") are added while stirring to a sodium methylate solution (consisting of 125 cc. of methanol and 1.0 gram of sodium). After the addition of 6 cc. of acetic acid of 95 percent strength the 3-iodo-5-nitro-4(4'-hydroxy-phen-oxy)-α-acetyl-amino-cinnamic acid methyl ester precipitates out. After recrystallization from glacial acetic acid the yield amounts to 14 grams. Melting point: 221–223°C. (corrected).

(d) *3-iodo-5-amino-4(4'-hydroxy-phenoxy)-α-acetyl-amino-cinnamic acid methyl ester*

78 grams of 3-iodo-5-nitro-4(4'-hydroxy-phenoxy)-α-acetylamino-cinnamic acid methyl ester are suspended in a mixture of 500 cc. of methanol and 350 cc. of dimethylformamide and the suspension formed is hydrogenated in a shaking device in the presence of 25 grams of Raney-nickel. After the theoretical amount of hydrogen has been taken up the catalyst is filtered off with suction and the filtrate is completely evaporated under reduced pressure. The remaining sirup crystallizes when being triturated with water. The 3-iodo-5-amino-4(4'-hydroxy-phenoxy)-α-acetylamino-cinnamic acid methyl ester obtained is recrystallized from dilute acetic acid. Yield: 56 grams; melting point: 215° C. (corrected).

(e) *3-5-di-iodo-4(4'-hydroxy-phenoxy)-α-acetylamino-cinnamic acid methyl ester*

A solution of 30 grams of 3-iodo-5-amino-4(4'-hydroxy-phenoxy)-α-acetylamino-cinnamic acid methyl ester in 130 cc. of acetic acid of 95 percent strength and 50 cc. of concentrated sulfuric acid is slowly dropped at +2° C. into a nitrosylsulfuric acid prepared from 130 cc. of concentrated sulfuric acid and 9 grams of sodium nitrite. After stirring for half an hour the diazonium salt solution is dropped into a solution of 3.5 grams of potassium iodide, 5.2 grams of iodine and 2 grams of urea in 150 cc. of water and 30 cc. of chloroform. After the iodine in excess has been reduced with a sodium bisulfite solution the separated chloroform solution is evaporated to dryness. The residue is recrystallized from acetic acid. Yield: 23 grams of 3,5-di-iodo-4(4'-hydroxy-phenoxy)-α-acetylamino-cinnamic acid methyl ester; melting point: 264–265° C. (corrected). The ester is converted into the DL-3,3',5-tri-iodo-thyronine according to the process of Example 1.

EXAMPLE 3

(a) *3-iodo-5-nitro-4(4'-methoxy-phenoxy)-benzaldehyde*

3-iodo-5-nitro-4(4'-methoxy-phenoxy)-benzaldehyde is prepared according to Example 1(a).

(b) *2"-methyl-4"-[3-iodo-5-nitro-4(4'-methoxy-phenoxy)-benzylidene]-oxazolone(5")*

40 grams of 3-iodo-5-nitro-4(4'-methoxy-phenoxy)-benzaldehyde are heated for 2½ hours to 100° C. together with 12 grams of aceturic acid and 10 grams of anhydrous sodium acetate in 70 cc. of acetic anhydride. After the reactants have temporarily dissolved completely, the oxazolone derivative begins to separate out. The separation is completed by cooling. After the solid substance has been separated, it is first washed with carbon tetrachloride and then with water. Finally the 2"-methyl-4"-[3-iodo-5-nitro-4(4'-methoxy - phenoxy) - benzylidene]-oxazolone-(5") obtained is recrystallized from benzene. Yield: 35 grams; melting point: 205–206° C. (corrected).

(c) *3-iodo-5-nitro-4(4'-methoxy-phenoxy)-alpha - acetylamino-cinnamic acid methyl ester*

20 grams of 2"-methyl-4"[3-iodo-5-nitro-4(4'-methoxy-phenoxy)-benzylidene]oxazolone-(5") are introduced at 20° while stirring into a sodium methylate solution (200 cc. of methanol and 1.2 grams of sodium). Soon the desired 3-iodo-5-nitro-4(4'-methoxy-phenoxy)-alpha-acetylamino-cinnamic acid methyl ester precipitates from the solution first clear. After the addition of 5 cc. of acetic acid of 95 percent strength it is filtered with suction. Together with the cinnamic acid methyl ester obtained by evaporating the mother liquor the yields amounts to 18 grams after the whole has been recrystallized from acetic acid of 95 percent strength; melting point: 216° C. (corrected).

(d) *3-iodo-5-amino-4(4'-methoxy-phenoxy)-alpha-acetylamino-cinnamic acid methyl ester*

67 grams of 3-iodo-5-nitro-4(4'-methoxy-phenoxy)-alpha-acetyl-amino-cinnamic acid methyl ester are suspended in 450 cc. of methanol and after the addition of 25 grams of Raney-nickel the suspension is hydrogenated in a shaking device. If after about 2 hours 8.55 litres of hydrogen have been taken up, most of the hydrogenation product has already separated in a crystalline form. It is filtered off with suction and separated from the catalyst by dissolving it in tetrahydrofurane. After the solution has been concentrated under reduced pressure it is mixed with water. Upon rubbing the 3-iodo-5-amino-4(4'-methoxy-phenoxy)-alpha-acetylaminocinnamic acid methyl acid soon crystallizes out. After recrystallization from methanol the yield amounts to 38 grams; melting point 184° C. (corrected).

(e) *3,5-di-iodo-4(4'-methoxy-phenoxy)-alpha - acetylamino-cinnamic acid methyl ester*

At 20° C. a solution of 5.0 grams of 3-iodo-5-amino-4(4'-methoxy-phenoxy)-alpha-acetylamino-cinnamic acid methyl ester in 20 cc. of acetic acid of 95 percent strength and 7 cc. of concentrated sulfuric acid is slowly dropped into a nitrosylsulfuric acid prepared from 15 cc. of concentrated sulfuric acid, 30 cc. of glacial acetic acid and 1.1 grams of sodium nitrite. After half an hour the diazonium salt solution is introduced into a mixture of 3.5 grams of potassium iodide, 5.2 grams of iodine and 2.0 grams of urea in 150 cc. of water and 30 cc. of chloroform. After 1 hour the iodine in excess is reduced with sodium hydrosulfite and the chloroform layer is separated. The residue remaining after the chloroform has been evaporated is recrystallized from glacial acetic acid. Yield: 3.9 grams; melting point: 209° C. (corrected).

The further conversion of the 3,5-di-ido-4(4'-methoxy-phenoxy)-alpha-acetylamino-cinnamic acid methyl ester into DL-3,3',5-tri-iodo-thyronine can be carried through according to Example 1 (*f*) and (*g*).

EXAMPLE 4

(a) *3-iodo-5-nitro-4(4'-methoxy-3'-iodo-phenoxy) - benzaldehyde*

38 grams of 3-iodo-5-nitro-4-hydroxybenzaldehyde are dissolved while heating in 140 cc. of dry pyridine. At 12–20° C. 25 grams of benzenesulfonic acid chloride are slowly added. After the mixture has been allowed to stand for some time the pyridinium compound formed crystallizes out. After having been allowed to stand for some hours, 32 grams of 4-methoxy-3-iodo phenol dissolved in 30 cc. of pyridine are added. The mixture is then heated for one hour to boiling. The principal amount of the pyridine is then distilled off under reduced pressure. The residue is digested with 2 N hydrochloric acid and separated off. After the residue has been further triturated with ether it is filtered off with suction and washed with ether. Thereupon the 3-iodo-5-nitro-4(4'-methoxy-3'-iodo-phenoxy)-benzaldehyde obtained is recrystallized from di-n-butylether. Yield: 45 grams; melting point: 168° C. (corrected).

(b) *2"-methyl-4"[3-iodo-5-nitro-4(4'-methoxy - 3' - iodo-phenoxy)-benzylidene]oxazolone-(5")*

45 grams of 3-iodo-5-nitro-4(4'-methoxy-3'-iodo-phenoxy)-benzaldehyde, 11 grams of aceturic acid and 10 grams of anhydrous sodium acetate are heated for 2½ hours in 70 cc. of acetic anhydride to 100° C. After cooling the oxazolone derivative crystallized out is filtered off with suction, and washed first with acetic acid of 95 percent strength, subsequently with carbon tetrachloride and water. Yield: 45 grams of 2"-methyl-4"-[3-iodo-5-nitro-4(4'-methoxy-3'-iodo-phenoxy) - benzylidene]-oxazolone-(5"); melting point: 210° C. (corrected).

(c) *3-iodo-5-nitro-4(4'-methoxy-3'-iodo-phenoxy)-alpha-acetylamino-cinnamic acid methyl ester*

At +20° C. 44 grams of 2"-methyl-4"[3-iodo-5-nitro-4(4'-methoxy-3'-iodo-phenoxy)-benzylidene] - oxazolone-(5") are introduced while stirring into a sodium methylate solution (from 350 cc. of methanol and 0.7 gram of sodium). After a short time the desired 3-iodo-5-nitro-4(4'-methoxy-3'-iodo - phenoxy)-alpha-acetylamino-cinnamic acid methyl ester separates from the solution. After 30 minutes it is filtered off with suction after 5 cc. of acetic acid of 95 percent strength have been added and the residue is recrystallized from acetic acid of 95 percent strength. After drying the yield amounts to 40 grams; melting point: 209° C. (corrected).

(d) *3-iodo-5-amino-4(4'-methoxy-3'-iodo-phenoxy)-alpha-acetylamino-cinnamic acid methyl ester*

16.3 grams of 3-iodo-5-nitro-4(4'-methoxy-3'-iodo-phenoxy)-alpha-acetylamino-cinnamic acid methyl ester are suspended in 500 cc. of methanol and the suspension is hydrogenated in a shaking device in the presence of Raney-nickel as a catalyst. After the calculated amount of hydrogen has been taken up the desired 3-iodo-5-amino-4(4'-methoxy-3'-iodo-phenoxy)-alpha-acetylamino-cinnamic acid methyl ester separates out. After the crystallisate has been filtered off with suction it is separated from the catalyst by dissolving in dimethyl-formamide. Both mother liquors are evaporated together under reduced pressure. If the residue is treated with a little benzene, crystallization sets in. It is filtered with suction and recrystallized from glacial acetic acid. Yield: 14 grams; melting point: 220° C. (corrected).

(e) *3,3',5 - tri - iodo - 4(4' - methoxy-phenoxy)-alpha-acetylamino-cinnamic acid methyl ester*

At 0° C. a solution of 3.3 grams of 3,3'-di-iodo-5-amino-4(4'-methoxy-phenoxy) - alpha-acetyl-amino-cinnamic acid methyl ester in a mixture of 15 cc. of acetic acid of 95 percent strength and 6 cc. of concentrated sulfuric acid is slowly dropped into a nitrosylsulfuric acid prepared from 15 cc. of concentrated sulfuric acid, 15 cc. of acetic acid of 95 percent strength and 0.60 gram of sodium nitrite. After the mixture has been allowed to stand for half an hour this diazonium salt solution is dropwise introduced into a mixture of 1.8 grams of potassium iodide, 2.8 grams of iodine and 2 grams of urea in 100 cc. of water and 30 cc. of chloroform. After half an hour the iodine in excess is reduced with sodium hydrosulfite solution. Thereupon the chloroform layer is separated and concentrated. The solid residue in form of the 3,3',5 - tri-iodo - 4(4' - methoxy-phenoxy)-alpha-acetylamino-cinnamic acid methyl ester is triturated with methanol and filtered off with suction. After recrystallization from glacial acetic acid the yield amounts to 2.8 grams; melting point: 214° C. (corrected).

EXAMPLE 5

(a) *3-iodo-5-nitro-4(4'-hydroxy-3'-nitro-phenoxy)-benzaldehyde*

12 grams of 3-iodo-5-nitro-4-hydroxybenzaldehyde are dissolved at 22° in 70 grams of dry pyridine and 8.8 grams of p-toluene sulfonic acid chloride are added. After a short stirring the pyridinium salt formed separates. After 1½ hours 8.8 grams of nitro-hydroquinine are added to this reaction mixture. After boiling under reflux for 2 hours the pyridine is evaporated under reduced pressure. The remaining sirup is taken up in 200 cc. of chloroform; the chloroform solution is agitated with ice-cold 2 N hydrochloric acid, in the course of which operation a little resin separates. After the chloroform solution has repeatedly been shaken with 10 cc. of 2 N hydrochloric acid it is washed with water, dried and evaporated under reduced pressure. 12 grams of crude 3-iodo-5-nitro-4(4'-hydroxy - 3' - nitro-phenoxy)-benzaldehyde separate. This product is recrystallized from 50 cc. of glacial acetic acid and is obtained in the form of yellow needles. Melting point: 146° C.

(b) *2"-phenyl-4"[3-iodo-5-nitro-4(4'-hydroxy-3'-nitro-phenoxy)-benzylidene]-oxazolone-(5")*

21.5 grams of 3-iodo-5-nitro-4(4'-hydroxy-3'-nitro-phenoxy)-benzaldehyde are heated to 100° C. together with 9.1 grams of hippuric acid and 25 grams of freshly molten sodium acetate in 75 cc. of acetic anhydride. After a temporarily complete liquefaction the precipitation of the desired 2"-phenyl-4"-3-iodo-5-nitro-4(4'-hydroxy-3'-nitro-phenoxy)-benzylidene-oxazolone-(5") sets in spontaneously after a few minutes. The product is filtered with suction, washed several times with water and dried. Yield: 26 grams; melting point: 214° C.

(c) *3-iodo-5-nitro-4(4'-hydroxy-3'-nitro-phenoxy)-alpha-benzoyl-amino-cinnamic acid*

130 grams of 2"-phenyl-4"-[3-iodo-5-nitro-4-(4'-hydroxy-3'-nitro-phenoxy)-benzylidene]oxazolone-(5") are introduced into a solution of 40.5 grams of sodium hydroxide in 800 cc. of water and 1.5 litres of alcohol. At 35° C. a clear solution is formed, which is acidified with 2 N hydrochloric acid (up to a pH of 6). The desired 3-iodo-5-nitro-4(4' - hydroxy-3'-nitro-phenoxy)-alpha-benzoylamino-cinnamic acid then precipitates. Yield of the crude product: 90 grams. For purifying the precipitate it is boiled with 1.5 litres of acetone and the solution is treated with active charcoal. 1.5 litres of ethanol are then added and the principal amount of the acetone is distilled. The cinnamic acid derivative precipitates in a crystalline form. Yield: 53 grams melting point: 234° C.

(d) *3-iodo-5-amino-4(4'-hydroxy-3'-amino-phenoxy)-alpha-benzoylamino-cinnamic acid*

(α) 5 grams of 3-iodo-5-nitro-4(4'-hydroxy-3'-nitro-phenoxy)-alpha-benzoylamino-cinnamic acid are suspended in 200 cc. of dioxane and the suspension is hydrogenated in a shaking device with 0.7 gram of Raney-nickel. After 1.4 litres of hydrogen have been taken up it is separated from the catalyst by filtration and the filtrate is introduced while stirring into 2 litres of water. 3 - iodo-5-amino-4(4'-hydroxy-3'-amino-phenoxy)-alpha-benzoylamino-cinnamic acid then precipitates.

(β) 5 grams of 3-iodo-5-nitro-4(4'-hydroxy-3'-nitro-phenoxy)-alpha-benzoylamino-cinnamic acid are suspended in 150 cc. of dioxane and the solution is dropwise added at 30–40% C. while stirring well to a suspension of 40 grams ferrous hydroxide in 200 cc. of water. The reduction of the nitro group is terminated after about 15 minutes and is obvious by the brown coloration of the reaction mixture. The ferrous hydroxide is then filtered off with suction. Upon lyophilization of the colorless filtrate the above-mentioned tri-amino-cinnamic acid derivative remains as a white powder.

In order to identify the 3-iodo-5-amino-4(4'-hydroxy-3'-amino-phenoxy) - alpha - benzoylamino-cinnamic acid there has been prepared the 3-iodo-5-benzoylamino-4-(4'-benzoyloxy - 3' - benzoylamino-phenoxy)-alpha-benzoyl-amino-cinnamic acid, which answers to the following analytical data:

*Analysis.*—$C_{43}H_{30}O_8N_3I$ (molecular weight 843.63): Calculated: N 4.93%; I 15.04%. Found: N 5.03%; I 14.28%.

(e) *3,5-di-iodo-4(4'-hydroxy-3'-iodo-phenoxy)-alpha-benzoylamino-cinnamic acid*

While cooling, 25 cc. of glacial acetic acid are added to a mixture of 12 cc. of concentrated sulfuric acid and 2 grams of sodium nitrite. A solution of 5.5 grams of 3 - iodo-5-amino-4(4'-hydroxy-3'-amino-phenoxy)-alpha-benzoylamino-cinnamic acid in a mixture of 12 cc. of glacial acetic acid and 6 cc. of concentrated sulfuric acid is then dropwise added within one hour at —2° C. After stirring for one hour the diazonium salt solution is introduced in a thin jet into a rigorously stirred mixture of 8 grams of potassium iodide, 6.5 grams of iodine, 1.2 grams of urea, 145 cc. of water and 50 cc. of chloroform. The temperature rises to about 30° C. After the iodine in excess has been reduced with sodium hydrosulfite the 3,5-di-iodo-4(4'-hydroxy-3'-iodo-phenoxy)-alpha benzoyl-amino-cinnamic acid is isolated according to Examples 1(e) and 2(e), respectively.

EXAMPLE 6

(a) *3-iodo-5-nitro-4(4'-n-butoxy phenoxy)-benzaldehyde*

14 grams of 3-iodo-5-nitro-4-hydroxybenzaldehyde are suspended in 55 cc. of dry pyridine and the suspension obtained is reacted, while stirring at 20° C. with 9.2 grams of benzenesulfochloride. After the mixture has been allowed to stand for 2 hours 10.6 grams of 4-n-butoxy-phenol are added and the mixture is heated for 1 hour under reflux. The main portion of the pyridine is then distilled off under reduced pressure. The residue is dissolved with ether and 2 N hydrochloric acid. The ethereal layer is washed with 2 N sodium hydroxide solution and concentrated. The yield amounts to 16 grams of an oil crystallizing when being triturated. The 3-iodo-5-nitro-4(4'-n-butoxy-phenoxy)-benzaldehyde thus obtained melts at 53° C. (corrected).

(b) *2"-phenyl-4"[2-iodo-5-nitro-4(4'-n-butoxy-phenoxy)-benzylidene]oxazolone-(5")*

15 grams of 3-iodo-5-nitro-4(4'-n-butoxy-phenoxy)-benzaldehyde, 6.5 grams of hippuric acid and 4 grams of anhydrous sodium acetate are heated for 3 hours with 30 cc. of acetic anhydride on the steam bath. After cooling the oxazolone crystallizes. It is filtered with suction and washed with carbon tetrachloride and water. Yield: 9.4 grams, melting point: 179–180° C. (corrected).

(c) *3-iodo-5-nitro-4(4'-n-butoxy-phenoxy)-alpha-benzoyl-amino-cinnamic acid methyl ester*

8.3 grams of 2"-phenyl-4"[3-iodo-5-nitro-4(4'-n-butoxy-phenoxy)-benzylidene]oxazolone-(5") are introduced while stirring into a sodium methylate solution (prepared from 55 cc. of methanol and 0.7 gram of sodium). After one hour 5 cc. of acetic acid of 95 percent strength are added. The ester which has separated is filtered off with suction and washed with methanol. Yield: 8.5 grams, melting point: 185–186° C. (corrected).

The 3-iodo-5-nitro-4-(4'-n-butoxy-phenoxy)-alpha-benzoyl-amino-cinnamic acid methyl ester is now converted into the DL-3,3',5-tri-iodo-thyronine according to the process described in Example 1.

EXAMPLE 7

(a) *3 - iodo - 5-nitro-4(4'-n-octyloxy-phenoxy)-benzaldehyde*

28 grams of 3-iodo-5-nitro-4-hydroxybenzaldehyde are suspended in 110 cc. of dry pyridine and, while stirring the suspension is reacted with 18.5 grams of benzene-sulfochloride at 20° C. After the whole has been allowed to stand for 2 hours 28 grams of 4-n-octyl-oxy-phenol are added. The mixture is then heated to 105° C. for one hour and the pyridine is distilled over under reduced pressure. The residue is dissolved with ether and 2 N hydrochloric acid, the ethereal layer is washed with 2 N sodium hydroxide solution and subsequently with water. After the ether has been distilled the 3-iodo-5-nitro-4(4'-n-octyloxy-phenoxy)-benzaldeyde remains in the form of an oil which soon crystallizes. Melting point: 76–77° C.

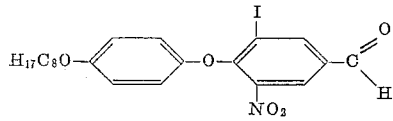

(b) *2" - phenyl - 4"[-3-iodo-5-nitro-4(4'-n-octyloxy-phenoxy)-benzylidene]-oxazolone-(5")*

29 grams of 3-iodo-5-nitro-4(4'-n-octyloxy-phenoxy)-benzaldehyde, 11 grams of hippuric acid and 7 grams of anhydrous sodium acetate are heated on a steam bath for 2 and a half hour together with 30 cc. of acetic anhydride. After cooling the oxazolone separates out. It is filtered with suction and washed with carbon tetrachloride. Yield: 24 grams, melting point 132° C. (corrected).

(c) *3 - iodo - 5-nitro-4(4'-n-octyloxy-phenoxy)-alpha-benzoylamino-cinnamic acid methyl ester*

9 grams of 2"-phenyl-4"[-3-iodo-5-nitro-4(4'-n-octyloxy-phenoxy)-benzylidene]-oxazolone-(5") are introduced while stirring into a sodium methylate solution (prepared from 55 cc. of methanol and 0.7 gram of sodium). After one hour 5 cc. of acetic acid of 95 percent strength are added, during which operation the cinnamic acid methyl ester derivative separates in a crystalline form. It is filtered off with suction and washed with methanol. Yield: 9.4 grams, melting point: 169° C. (corrected).

The 3 - iodo - 5-nitro - 4-(4-n-octyloxy-phenoxy)-alpha-benzoyl-amino-cinnamic acid methyl ester is then transformed into the DL-3,3',5-tri-iodo-thyronine according to the process described in Example 1.

EXAMPLE 8

*3-iodo-5-nitro-4(4'-hydroxy-phenoxy)-benzaldehyde*

38.5 grams of 3-iodo-5-nitro-4-hydroxy-benzaldehyde are dissolved in 160 cc. of dry pyridine while heating. After the solution has been cooled to about 15–20° C. 24 grams of benzene sulfochloride are dropped in while further cooling and stirring. The pyridinium salt separates. After the mixture has been allowed to stand for some hours, 27.5 grams of hydroquinone are added. Thereupon it is heated for 90 minutes to boiling and the pyridine is then evaporated under reduced pressure. The residue is then taken up in methylene chloride and this solution is washed with water, 2 N hydrochloric acid, 2 N sodium hydroxide solution and water. When being concentrated the methylene chloride solution deposits a resin which yields, when being processed with butylether, 16 grams of 3-iodo-5-nitro-4-(4'-hydroxy-phenoxy)-benzaldehyde. Melting point: 157° C. This 3-iodo-5-nitro-4-(4'-hydroxy-phenoxy)-benzaldehyde is then transformed into DL-3,3'5-tri-iodo-thyronine according to the process described in Example 1.

EXAMPLE 9

(a) *3 - iodo - 5-nitro-4-(4'-benzyloxy-phenoxy)-benzaldehyde*

5.5 grams of 3-iodo-5-nitro-4-hydroxy-benzaldehyde are suspended in 25 cc. of dry pyridine and the suspension formed is reacted with 3.7 grams of benzenesulfochloride at 20° C., while stirring. After the whole has been stirred for 2 hours 4.9 grams of 4-benzyloxy-phenol are added. After it has been heated for 90 minutes to boiling, the main portion of the pyridine is distilled under reduced pressure. The residue is treated with ether and 2 N hydrochloric acid. After having been separated from the undissolved substances the 3-iodo-5-nitro-4-(4'-benzyloxy-phenoxy)-benzaldehyde is obtained when the ether solution is evaporated. It is recrystallized from acetic acid of 95 percent strength. Yield: 7 grams, melting point: 134° C.

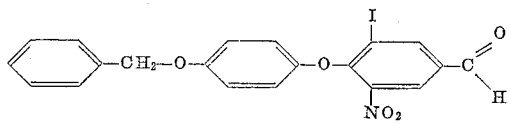

(b) *2"-phenyl-4"[3-iodo-5-nitro-4(4-benzyloxy-phenoxy)-benzylidene]-oxazolone-(5")*

5.5 grams of 3-iodo-5-nitro-4(4'-benzyloxy-phenoxy) benzaldehyde, 2.2 grams of hippuric acid and 1.5 grams of anhydrous sodium acetate are heated for 2 hours on the steam bath with 20 cc. of acetic anhydride. A solution is formed, from which the oxazolone derivative soon crystallizes out. The substance is filtered off with suction and washed with carbon tetrachloride and water. Yield: 3.4 grams, melting point: 203° C. (corrected).

(c) *3-iodo-5-nitro-4-(4'-benzyloxy-phenoxy)-alpha-benzoylamino-cinnamic acid methyl ester*

2.9 grams of 2″-phenyl-4″-[3-iodo-5-nitro-4(4'-benzyloxy-phenoxy)-benzylidene]-oxazolone-(5″) are introduced, while stirring, into a sodium methylate solution (prepared from 25 cc. of methanol and 0.25 gram of sodium). After one hour 2 cc. of acetic acid of 95 percent strength are added. The cinnamic acid methyl ester derivative separates and is filtered off with suction and washed with methanol. Yield: 2.9 grams, melting point: 225° C. (corrected). The 3-iodo-5-nitro-4-(4'-benzyloxy-phenoxy)-alpha-benzoylamino-cinnamic acid methyl ester is then transformed into the DL-3,3',5-tri-iodo-thyronine according to the process described in Example 1.

EXAMPLE 10

*3-iodo-5-nitro-4(4'-acetoxy-phenoxy)-benzaldehyde*

38.5 grams of 3-iodo-5-nitro-hydroxy-benzaldehyde are dissolved on the steam bath in 160 cc. of dry pyridine. At 20° C. 23.2 grams of benzenesulfochloride are dropped in, while stirring. When the pyridinium salt has crystallized out, 20 grams of 4-acetoxyphenol are added. After the mixture has been heated for 2 hours on the steam bath, the pyridine is distilled off under reduced pressure. The residue is dissolved in methylene chloride. The solution is then washed with water, 2 N-hydrochloric acid, 2 N sodium hydroxide solution and again with water. After the methylene chloride has been evaporated the crude 3-iodo-5-nitro-4-(4'-acetoxy-phenoxy)-benzaldehyde crystallizes out. It is recrystallized from dibutyl ether. Yield: 23.4 grams, melting point: 122° C.

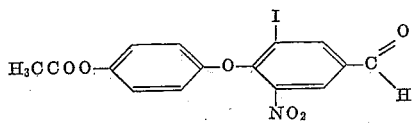

This 3-iodo-5-nitro-4-(4'-acetoxy-phenoxy)-benzaldehyde is converted into the DL-3,3',5-tri-iodo-thyronine according to the process of Example 1.

EXAMPLE 11

*2-iodo-6-nitro-2″-phenyl-4-formyl-oxazolo-(4″,5″:3',4')-diphenyl-ether=2'-phenyl-5'-(2-iodo-6-nitro-4-formyl-phenoxy)-benzoxazol*

3 grams of 3-iodo-5-nitro-4-hydroxy-benzaldehyde are introduced into 17 cc. of distilled anhydrous pyridine. 2.2 grams of toluene-sulfochloride are then added. After the mixture has been stirred for 1 hour 3 grams of 5-hydroxy-2-phenyl-benzoxazol are added. After the mixture has boiled for 2 hours under reflux, the pyridine is finally evaporated under reduced pressure. The remaining oil is taken up in 50 cc. of chloroform. This chloroform solution is then washed with 2 N hydrochloric acid and water, finally with 2 N soda solution and again with water. On subsequently evaporating the chloroform, the benzoxazol derivative remains. When being triturated with ethanol it crystallizes and is recrystallized from glacial acetic acid. Yield: 2.3 grams, melting point: 182–183° C.

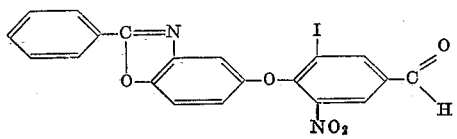

The 2-iodo-6-nitro-2″-phenyl-4-formyl-oxazolo-(4″,5″:3',4')-diphenylether (=2'-phenyl-5'-(2-iodo-6-nitro-4-formyl-phenoxy)-benzoxazol) is transformed into the DL-3,3',5-tri-iodo-thyronine according to the process described in Example 1.

EXAMPLE 12

(a) *2″-ethyl-4″[3-iodo-5-nitro-4-(4'-methoxy-phenoxy) benzylidene]oxazolone-(5″)*

10 grams of 3-iodo-5-nitro-4-(4'-methoxy-phenoxy)-benzaldehyde, 3.5 grams of N-propionylglycine and 3.5 grams of anhydrous sodium acetate are heated on a steam bath for 4 hours together with 20 cc. of acetic anhydride. The oxazolone derivative formed crystallizes out. It is filtered off with suction and washed with carbon tetrachloride and water. Yield: 9.2 grams, melting point: 183–185° C.

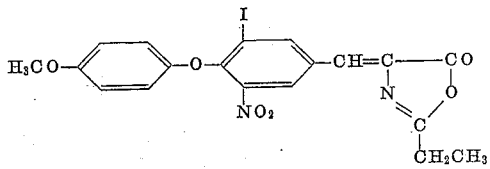

(b) *3-iodo-5-nitro-4-(4'-methoxy-phenoxy)-alpha-propionylamino-cinnamic acid methyl ester*

8.4 grams of 2″-ethyl-4″[3-iodo-5-nitro-4(4'-methoxy-phenoxy)-benzylidene]-oxazolone-(5″) are introduced at room temperature while stirring into a sodium methylate solution (prepared from 60 cc. of methanol and 0.8 gram of sodium). After 1 hour 4 cc. of acetic acid of 95 percent strength are added. The cinnamic acid methyl ester derivative precipitating out is filtered off with suction and washed with methanol. Yield 6.6 grams, melting point: 198–199° C.

The 3-iodo-5-nitro-4-(4'-methoxy-phenoxy)-alpha-propionyl-amino-cinnamic acid methyl ester is converted into the DL-3,3',5-tri-iodo-thyronine according to the process of Example 1.

EXAMPLE 13

(a) *2″-heptadecyl-4″[3-iodo-5-nitro-4(4'-methoxy-phenoxy)-benzylidene]-oxazolone-(5″)*

12 grams of 3-iodo-5-nitro-4(4'-methoxy-phenoxy)-benzaldehyde, 8 grams of N-stearoylglycine and 5 grams of anhydrous sodium acetate are heated on the steam bath for 3 hours together with 20 cc. of acetic anhydride. From the solution which is soon formed the oxazolone derivative crystallizes out on cooling. It is filtered off with suction and washed with water. Yield: 13 grams. After being recrystallized from carbon tetrachloride the substance melts at 104–105° C.

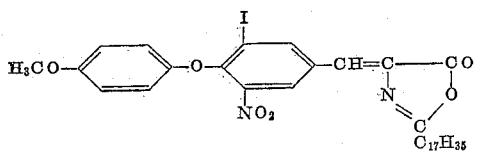

(b) *3-iodo-5-nitro-4(4'-methoxy-phenoxy)-alpha-stearoylamino-cinnamic acid methyl ester*

11.5 grams of 2″-heptadecyl-4″[3-iodo-5-nitro-4(4'-methoxy-phenoxy)-benzylidene]-oxazolone-(5″) are introduced while stirring into a sodium methylate solution (prepared from 60 cc. of methanol and 0.8 gram of sodium). After 1 hour 5 cc. of acetic acid of 95 percent strength are added. The cinnamic acid methyl ester derivative separated out is filtered off with suction and washed with methanol. Yield: 11.3 grams, melting point: 153° C.

The 3-iodo-5-nitro-4-(4'-methoxy-phenoxy)-alpha-stearoylamino-cinnamic acid methyl ester is converted into the DL-3,3',5-triiodo-thyronine according to the process of Example 1.

EXAMPLE 14

(a) *2"(β-phenylethyl)-4"[3-iodo - 5 - nitro-4(4'-methoxy-phenoxy)-benzylidene]-oxazolone-(5")*

20 grams of 3-iodo-5-nitro-4(4'-methoxy-phenoxy)-benzaldehyde, 11 grams of N-(β-phenyl-propionyl)-glycine and 8 grams of anhydrous sodium acetate are heated in 40 cc. of acetic anhydride for 3 and a half hours on the steam bath. On cooling, the oxazolone derivative crystallizes out of the solution. It is filtered off with suction and washed with carbon tetrachloride and water. Yield: 11 grams, melting point: 140° C. (corrected).

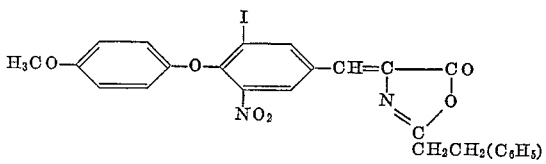

(b) *3-iodo - 5 - nitro-4(4'-methoxy-phenoxy)-alpha-N-(β-phenyl-propionyl)-amino-cinnamic acid methyl ester*

10.1 grams of 2"-(β-phenylethyl)-4"[3-iodo-5-nitro-4-(4'-methoxy-phenoxy) - benzylidene]-oxazolone-(5") are introduced at room temperature while stirring into a sodium methylate solution (prepared from 60 cc. of methanol and 0.8 gram of sodium). After 30 minutes 5 cc. of acetic acid of 95 percent strength are added. The cinnamic acid methyl ester derivative separates out. It is filtered off with suction and washed with methanol. Yield: 8.8 grams, melting point 194° C.

The 3-iodo - 5 - nitro-4(4'-methoxy-phenoxy)-alpha-N-phenylpropionyl)-amino-cinnamic acid methyl ester is transformed into the DL-3,3',5-triiodo-thyronine according to the process of Example 1.

We claim:

1. A process of preparing a polyiodo-thyronine which comprises (1) reacting 3-iodo-5-nitro-4-hydroxybenzaldehyde with a member selected from the group consisting of methyl sulfochloride, toluene sulfochloride and benzene sulfochloride in the presence of a tertiary amine and adding, without isolation of the ammonium compound so formed, a phenol of the general formula (A)

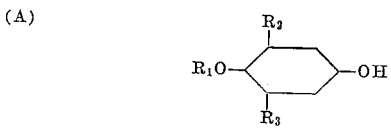

wherein $R_1$ represents a member of the group consisting of hydrogen, alkyl groups containing up to eight carbon atoms, benzyl, acetyl and benzoyl groups, $R_2$ and $R_3$ represent radicals of the group consisting of hydrogen, iodine and nitro groups and wherein $R_1$ and $R_2$ can be linked together to form an oxazole ring system, for forming a compound of the general formula (B)

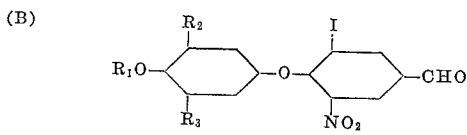

(2) condensing the compound of Formula B so obtained with a member of the group consisting of acetyl aminoacetic acid, propionyl aminoacetic acid, stearoyl aminoacetic acid, benzoyl aminoacetic acid and beta-phenyl propionyl aminoacetic acid at a temperature between 70 and 100° C. for forming an oxazolone derivative of the compound of Formula B; (3) hydrolyzing said oxazolone derivative at a temperature between 35 and 100° C. for forming a corresponding alpha-acylamino cinnamic acid derivative; (4) reducing each nitro group in said cinnamic acid derivative to an amino group; (5) replacing each said amino group with iodine for forming the corresponding polyiodo-4-phenoxy-acylamino cinnamic acid derivative; and (6) hydrogenating said cinnamic acid derivative for forming the corresponding polyiodo-thyronine.

2. A process of preparing a polyiodo-thyronine which comprises (1) reacting 3-iodo-5-nitro-4-hydroxybenzaldehyde with a member selected from the group consisting of methyl sulfochloride, toluene sulfochloride and benzene sulfochloride in the presence of a tertiary amine and adding, without isolation of the ammonium compound so formed, a phenol of the general formula (A)

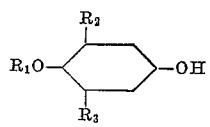

wherein $R_1$ represents a member of the group consisting of hydrogen, alkyl groups containing up to eight carbon atoms, benzyl, acetyl and benzoyl groups, $R_2$ and $R_3$ represent radicals of the group consisting of hydrogen, iodine and nitro groups and wherein $R_1$ and $R_2$ can be linked together to form an oxazole ring system, for forming a compound of the general formula (B)

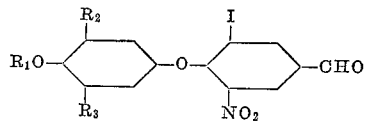

(2) condensing the compound of Formula B so obtained with a member of the group consisting of acetyl aminoacetic acid, propionyl aminoacetic acid, stearoyl aminoacetic acid, benzoyl aminoacetic acid and beta-phenyl propionyl aminoacetic acid at a temperature between 70 and 100° C. for forming an oxazolone derivative of the compound of Formula B; (3) hydrolyzing said oxazolone derivative at a temperature between 35 and 100° C. for forming a corresponding 3-iodo-4-phenoxy-5-nitro-alpha-acylamino cinnamic acid derivative; (4) reducing the nitro group in said cinnamic acid derivative to an amino group; (5) diazotizing said amino group; (6) converting the diazonium salt at a temperature between 20 and 50° C. to the corresponding 3,5-diiodo-4-phenoxy-acylamino cinnamic acid derivative; (7) hydrogenating said cinnamic acid derivative for forming the corresponding 3,5-diiodo-thyronine; and (8) introducing a further iodine atom in the 3'-position of said thyronine for forming 3,3'5-triiodo-thyronine.

3. A process of preparing 3,3',5 - triiodo-thyronine which comprises (1) reacting 3-iodo-5-nitro-4-hydroxy-benzaldehyde with benzene sulfochloride in the presence of pyridine and adding, without isolation of the ammonium compound so formed, 4-methoxyphenol for forming 3-iodo-5-nitro-4(4'-methoxy-phenoxy)-benzaldehyde; (2) condensing said benzaldehyde so obtained with benzoyl aminoacetic acid in the presence of acetic anhydride and sodium acetate at a temperature between 70 and 100° C. for forming an oxazolone derivative of said benzaldehyde; (3) hydrolyzing said oxazolone derivative in the presence of an alkali alcoholate at a temperature between 35 and 100° C. for forming a 3-iodo-5-nitro-4(4'-methoxy-phenoxy) - alpha - benzoylamino cinnamic acid derivative; (4) reducing the nitro group in said derivative to an amino group; (5) diazotizing said amino group; (6) converting the diazonium salt at a temperature between 20 and 50° C. to the corresponding 3,5-diiodo-4(4'methoxy-phenoxy)-alpha-benzoylamino cinnamic acid derivative; (7) hydrogenating said cinnamic acid derivative for forming 3,5-diiodo-thyronine; and (8) introducing a further iodine atom in the 3'-position of said thyronine for forming 3,3',5-triiodo-thyronine.

4. A process which comprises (1) reacting 3-iodo-5-nitro-4-hydroxybenzaldehyde with a member selected from the group consisting of methyl sulfochloride, toluene sulfochloride and benzene sulfochloride in the presence of a tertiary amine and adding, without isolation of the ammonium compound so formed, a phenol of the general formula (A) 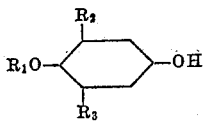

wherein $R_1$ represents a member of the group consisting of hydrogen, alkyl groups containing up to eight carbon atoms, benzyl, acetyl and benzoyl groups, $R_2$ and $R_3$ represent radicals of the group consisting of hydrogen, iodine and nitro groups and wherein $R_1$ and $R_2$ can be linked together to form an oxazole ring system, for forming a compound of the general formula (B) 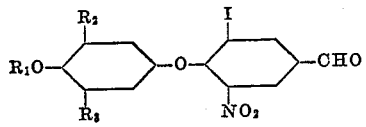

(2) condensing the compound of Formula B so obtained with a member of the group consisting of acetyl aminoacetic acid, propionyl aminoacetic acid, stearoyl aminoacetic acid, benzoyl aminoacetic acid and beta-phenyl propionyl aminoacetic acid at a temperature between 70 and 100° C. for forming an oxazolone derivative of the compound of Formula B; (3) hydrolyzing said oxazolone derivative at a temperature between 35 and 100° C. for forming a corresponding alpha-acylamino cinnamic acid derivative; and (4) reducing each nitro group in said cinnamic acid derivative to an amino group.

5. A process which comprises (1) reacting 3-iodo-5-nitro-4-hydroxybenzaldehyde with a member selected from the group consisting of methyl sulfochloride, toluene sulfochloride and benzene sulfochloride in the presence of pyridine and adding, without isolation of the ammonium compound so formed, a phenol of the general formula (A) 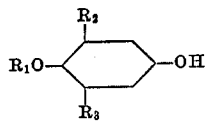

wherein $R_1$ represents a member of the group consisting of hydrogen, alkyl groups containing up to eight carbon atoms, benzyl, acetyl and benzoyl groups, $R_2$ and $R_3$ represent radicals of the group consisting of hydrogen, iodine and nitro groups and wherein $R_1$ and $R_2$ can be linked together to form an oxazole ring system, for forming a compound of the general formula (B) 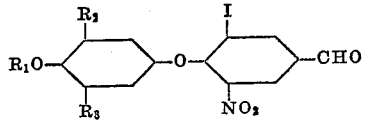

(2) condensing the compound of Formula B so obtained with a member of the group consisting of acetyl aminoacetic acid, propionyl aminoacetic acid, stearoyl aminoacetic acid, benzoyl aminoacetic acid and beta-phenyl propionyl aminoacetic acid in the presence of acetic anhydride and an alkali metal salt of acetic acid at a temperature between 70 and 100° C. for forming an oxazolone derivative of the compound of Formula B; (3) hydrolyzing said oxazolone derivative in the presence of an alkali alcoholate at a temperature between 35 and 100° C. for forming a corresponding alpha-acylamino cinnamic acid derivative; and (4) reducing each nitro group in said cinnamic acid derivative to an amino group.

6. A process which comprises (1) reacting 3-iodo-5-nitro-4-hydroxybenzaldehyde with a member selected from the group consisting of methyl sulfochloride, toluene sulfochloride and benzene sulfochloride in the presence of a tertiary amine and adding, without isolation of the ammonium compound so formed, a phenol of the general formula (A) 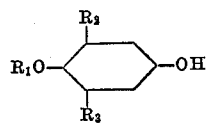

wherein $R_1$ represents a member of the group consisting of hydrogen, alkyl groups containing up to eight carbon atoms, benzyl, acetyl and benzoyl groups, $R_2$ and $R_3$ represent radicals of the group consisting of hydrogen, iodine and nitro groups and wherein $R_1$ and $R_2$ can be linked together to form an oxazole ring system, for forming a compound of the general formula (B) 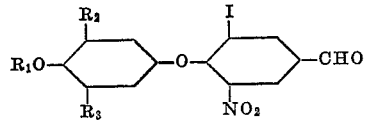

(2) condensing the compound of Formula B so obtained with a member of the group consisting of acetyl aminoacetic acid, propionyl aminoacetic acid, stearoyl aminoacetic acid, benzoyl aminoacetic acid and beta-phenyl propionyl aminoacetic acid at a temperature between 70 and 100° C. for forming an oxazolone derivative of the compound of Formula B; and (3) hydrolyzing said oxazolone derivative at a temperature between 35 and 100° C. for forming a corresponding alpha-acylamino cinnamic acid derivative.

7. A product of the general formula

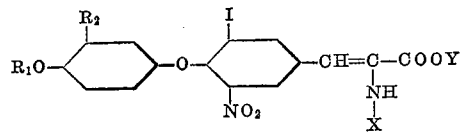

wherein X represents a member of the group consisting of acetyl, propionyl, stearoyl, benzoyl, beta-phenyl-propionyl, $R_1$ represents a member of the group consisting of H, $CH_3$, butyl, octyl, benzyl, acetyl, benzoyl and $R_2$ represents a member of the group consisting of H, I and $NH_2$, and Y represents a member of the group consisting of H and $CH_3$.

8. Products of the general formula

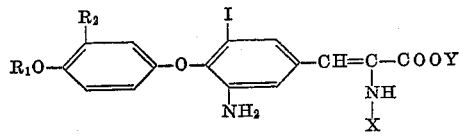

wherein X represents a member of the group consisting of acetyl, propionyl, stearoyl, benzoyl, β-phenyl-propionyl, $R_1$ represents a member of the group consisting of H, $CH_3$, butyl, octyl, benzyl, acetyl, benzoyl and $R_2$ represents a member of the group consisting of H, I and $NH_2$, and Y represents a member of the group consisting of H and $CH_3$.

9. 3 - iodo - 5 - amino - 4(4' - hydroxy - phenoxy)-alpha-acetylamino-cinnamic acid methyl ester.

10. 3 - iodo - 5 - amino - 4(4' - methoxy - phenoxy)-alpha-benzoylamino-cinnamic acid methyl ester.

11. 3 - iodo - 5- amino - 4(4' - methoxy - phenoxy)-alpha-acetylamino-cinnamic acid methyl ester.

12. 3 - iodo - 5 - amino - 4(4' - methoxy - 3' - iodo-phenoxy)-alpha-acetyl-amino-cinnamic acid methyl ester.

13. 3 - iodo - 5 - amino - 4(4' - hydroxy - 3' - amino phenoxy)-alpha-benzoyl-amino-cinnamic acid.

References Cited in the file of this patent

UNITED STATES PATENTS

| | | |
|---|---|---|
| 2,570,297 | Weisblat et al. | Oct. 9, 1951 |
| 2,579,668 | Hems et al. | Dec. 25, 1951 |
| 2,591,776 | Borrows | Apr. 8, 1952 |
| 2,600,835 | Borrows et al. | June 17, 1952 |
| 2,680,762 | Dickson | June 8, 1954 |

OTHER REFERENCES

Harington et al.: J. Biochem., 21, 169 to 173, 179, 180 (1927).

Chalmers et al.: J. Chem. Soc., 1949, 3428.

Borrows et al.: J. Chem. Soc., 1949, S199–204, S208.